US006783846B2

(12) United States Patent
Larsson et al.

(10) Patent No.: US 6,783,846 B2
(45) Date of Patent: Aug. 31, 2004

(54) USE OF ALKYLHYDROXYALKYL CELLULOSE POSSIBLY IN COMBINATION WITH A CARBOXYMETHYL CELLULOSE FOR THE IMPROVEMENT OF GLOSS AND PRINTABILITY

(75) Inventors: Kerstin Larsson, Stenungsund (SE); Erland Hermansson, Turku (FI)

(73) Assignee: Akzo Nobel N.V., Arnhem (NL)

( * ) Notice: Subject to any disclaimer, the term of this patent is extended or adjusted under 35 U.S.C. 154(b) by 31 days.

(21) Appl. No.: 10/359,702

(22) Filed: Feb. 5, 2003

(65) Prior Publication Data

US 2003/0199617 A1 Oct. 23, 2003

Related U.S. Application Data

(63) Continuation of application No. PCT/SE01/01434, filed on Jun. 21, 2001.

(30) Foreign Application Priority Data

Jul. 19, 2000 (SE) .............................................. 0002702

(51) Int. Cl.$^7$ .............................. B05D 3/02; C08K 3/22
(52) U.S. Cl. ...................... 428/330; 428/534; 524/413; 524/497; 427/361; 427/365; 427/395; 427/396; 427/391; 427/392; 523/200; 523/205; 523/206
(58) Field of Search ................................. 428/330, 534; 427/361, 365, 395, 396, 391, 392; 524/413, 497; 523/200, 205, 206

(56) References Cited

U.S. PATENT DOCUMENTS

| 4,302,367 A | | 11/1981 | Cordes et al. ............. 260/17 R |
| 4,865,914 A | | 9/1989 | Malhotra ..................... 428/331 |
| 5,412,019 A | * | 5/1995 | Roulstone et al. .......... 524/497 |
| 5,534,585 A | * | 7/1996 | Roulstone et al. .......... 524/497 |
| 5,725,648 A | | 3/1998 | Brown et al. ............. 106/162.8 |
| 5,795,928 A | | 8/1998 | Janssen et al. ................. 524/48 |
| 6,123,996 A | * | 9/2000 | Larsson et al. ............. 427/361 |

FOREIGN PATENT DOCUMENTS

| EP | 0425997 B1 | 5/1994 |
| EP | 0496269 | 3/1997 |
| WO | WO97/46757 | 12/1997 |

OTHER PUBLICATIONS

Abstract No. 19930923, abstracting EP 307795A, 5/95.
Abstract No. 19930629, abstracting JP 5162437, 3/94.

* cited by examiner

Primary Examiner—Leszek Killiman
(74) Attorney, Agent, or Firm—Ralph J. Mancini

(57) ABSTRACT

The present invention relates to use of an alkylhydroxyalkyl cellulose, which has alkyl groups having 1–3 carbon atoms and hydroxyalkyl groups having 2–3 carbon atoms, is free from hydrophobically modifying alkyl groups having at least 4 carbon atoms and has a turbidity point of 50–95° C. The amount of carboxymethyl cellulose constitutes up to 1200 percent by weight of the amount of alkylhydroxyalkyl cellulose. An aqueous coating composition containing a combination of alkylhydroxyethyl cellulose and carboxymethyl cellulose is also described.

12 Claims, No Drawings

USE OF ALKYLHYDROXYALKYL CELLULOSE POSSIBLY IN COMBINATION WITH A CARBOXYMETHYL CELLULOSE FOR THE IMPROVEMENT OF GLOSS AND PRINTABILITY

The present application is a continuation of International Patent Application Serial No. PCT/SE01/01434, filed on Jun. 21, 2001 and which claims priority of Sweden Patent Application Serial No. 0002702-9, filed on Jul. 19, 2000.

FIELD OF THE INVENTION

The present invention relates to the use of a nonionic alkylhydroxyalkyl cellulose to improve gloss and printability of a surface, for instance paper or cardboard, which is coated with a coating composition containing calcium carbonate and a latex. Advantageously, the non-ionic alkylhydroxyalkyl cellulose can be combined with a carboxymethyl cellulose.

BACKGROUND OF THE INVENTION

When coating, such as smearing or surface sizing of cellulose-based surface-shaped products, for instance paper or cardboard, with a composition the primary aim is to change the properties of the paper product, such as improved strength, improved appearance, improved properties of printability, improved impermeability or improved properties of adhesion. Thus, it is common to surface size paper or cardboard with an aqueous binder-containing composition in order to improve, inter alia, wet strength or to coat paper or cardboard with a composition that contains pigment pastes in order to improve the printing properties and the appearance of the surface. The coating compositions may, apart from binders and pigment, also contain secondary binders (co-binders), protective colloids, thickening agents and dispersing agents. It is common to add water-soluble or water-swellable polymers as thickening agent, protective colloid or secondary binders, on the basis of polyvinyl alcohol, modified celluloses, starch, casein, alginate or high molecular carboxyl-group-containing polymerizate.

EP 15 517 discloses the use of cellulose ethers in coating mixtures, where carboxymethyl cellulose is added as a secondary binder. It is already known from EP 307 795 to use, inter alia, methyl cellulose as a protective colloid. EP 425 997 discloses that hydrophobically modified alkyl cellulose, alkylhydroxyalkyl cellulose or hydroxyalkyl cellulose can be used as a thickening agent in aqueous paper coating compositions. The hydrophobic groups are preferably $C_{12-16}$ alkyl groups or alkyl aryl groups. When used in coating compositions these cellulose ethers, when compared with carboxymethyl cellulose ethers, give an improved viscosity at high shear rates.

From EP 496 269 it is also known to prepare a polysaccharide-containing suspension for paper coating, the suspension containing a low-molecular polysaccharide which is dissolved in aqueous phases and may be a carboxymethyl cellulose or a hydroxyethyl cellulose. Moreover, the coating composition contains one or more dispersed, i.e. not dissolved, cellulose polymers, such as hydroxypropyl cellulose, methyl cellulose, methylhydroxypropyl cellulose and hydrophobically modified hydroxyethyl cellulose.

WO 97/46757 discloses the use of a water-soluble non-ionic alkylhydroxyalkyl cellulose which contains alkyl groups having 1–3 carbon atoms and hydroxyalkyl groups having 2–3 carbon atoms but which is free from hydrophobically modified hydrocarbon groups having at least 4 carbon atoms, the cellulose ether having a turbidity point in the range 35–80° C., as a thickening agent in aqueous compositions for coating cellulose-based surface-shaped products. By using the cellulose ethers as a thickening agent, process engineering advantages are obtained when applying the coating compositions to surface-shaped cellulose products.

SUMMARY OF THE INVENTION

The present invention generally relates to the use of a non-ionic alkylhydroxyalkyl cellulose, which has alkyl groups having 1–3 carbon atoms and hydroxyalkyl groups having 2–3 carbon atoms, is free from hydrophobically modifying hydrocarbon groups having at least 4 carbon atoms and has a turbidity point of 50–95° C., or a combination of the alkylhydroxyalkyl cellulose with a carboxymethyl cellulose, where the amount of the carboxymethyl cellulose is 1200 percent by weight at the most of the amount of the alkylhydroxyalkyl cellulose in an aqueous coating composition containing a calcium carbonate and a latex in order to improve the gloss and the printability of the surface which is obtained when paper or cardboard is coated with the coating composition.

DETAILED DESCRIPTION OF THE INVENTION

According to the present invention, it has now been found that the use of a non-ionic alkylhydroxyalkyl cellulose, which has alkyl groups having 1–3 carbon atoms and hydroxyalkyl groups having 2–3 carbon atoms, is free from hydrophobically modifying hydrocarbon groups having at least 4 carbon atoms and has a turbidity point of 50–95° C., or a combination of the alkylhydroxyalkyl cellulose with a carboxymethyl cellulose, where the amount of the carboxymethyl cellulose is 1200 percent by weight at the most of the amount of the alkylhydroxyalkyl cellulose, in an aqueous coating composition containing a calcium carbonate, and a latex considerably improves the gloss and the printability of the surface that is obtained when paper or cardboard are coated with the coating composition.

Extensive studies have shown that the use of the alkylhydroxyalkyl cellulose in a latex coating composition which is pigmented with calcium carbonate gives an improved gloss and changes in the surface of the coating layer, such as higher hydrophilicity, higher surface energies and a higher relative polarity. These changes of the surface lead to improved printing properties. For example, the gloss, set-off and smoothness of the surface are improved. It has also been found that the carboxymethyl cellulose in combination with the alkylhydroxyalkyl cellulose gives a surprisingly good result, although the use of the carboxymethyl cellulose only gives a considerably lower hydrophilicity, surface energies, relative polarity, gloss and printability than the alkylhydroxyalkyl cellulose. Since the carboxymethyl cellulose in relation to the alkylhydroxyalkyl cellulose is easier to prepare and, moreover, is produced on a large scale, using a combination of carboxymethyl cellulose and alkylhydroxymethyl cellulose means a commercially attractive embodiment of the invention. It has also turned out that the coating composition which contains both an alkylhydroxyalkyl cellulose and a carboxymethyl cellulose according to the invention exhibit excellent rheology properties compared to a coating composition which contains carboxymethyl cellulose only. For instance, the viscosity of a coating composition containing the combination is less dependent on the shear rate than may be expected. If a combination of alkylhydroxyalkyl cellulose and carboxymethyl cellulose is used, the amount of carboxymethyl cellulose usually constitutes 20–1200 percent by weight, preferably 50–600 percent by weight, of the amount of the alkylhydroxyalkyl cellulose.

The viscosity of the alkylhydroxyalkyl cellulose may vary considerably and should in a conventional manner be adapted to the composition of the coating mixture. Usually it is in the range 5–100,000 mPa·s, preferably in the range 10–10,000 mPa·s, measured in a Brookfield viscosimeter of the type LV in a 2% solution at 20° C. Examples of suitable alkylhydroxyalkyl celluloses are ethylhydroxyethyl cellulose, methylethylhydroxyethyl cellulose, methylethylhydroxy-ethylhydroxypropyl cellulose, methylhydroxyethyl cellulose and methylhydroxypropyl cellulose. Usually the hydroxyethyl groups constitute at least 30% of the total number of hydroxyalkyl groups and the number of ethyl substituents usually constitute at least 10% of the total number of alkyl substituents. Examples of such cellulose ethers are ethylhydroxyethyl cellulose with $DS_{ethyl}$=0.8–1.3 and $MS_{hydroxyethyl}$=1.9–2.9 and methylethylhydroxyethyl cellulose with $DS_{methyl}$=1.0–2.5; $DS_{ethyl}$=0.1–0.6 and $MS_{hydroxyethyl}$=0.1–0.8. The amount of alkylhydroxyalkyl cellulose is usually from 0.05 to 3, preferably from 0.2 to 1.5 percent by weight of the composition.

The carboxymethyl cellulose usually has a degree of substitution of carboxymethyl of 0.6–1.5. It can exist in acid form, but preferably the salt form with a preferably monovalent cation, such as sodium, is used. The carboxymethyl cellulose usually has a somewhat lower viscosity than the alkylhydroxyalkyl cellulose and it is normally in the range 2–15,000 mPa·s, preferably in the range 5–5000 mPa·s, the viscosity being measured in the same manner as for the alkylhydroxyalkyl cellulose. Apart from carboxymethyl groups, the carboxymethyl cellulose can also contain other substituents, such as hydroxyethyl groups and methyl groups.

As already mentioned, the coating composition according to the invention is pigmented with calcium carbonate but can, advantageously, also contain other pigments. Examples thereof are kaolin, talc, titanium oxide, satin white, hydrated aluminium, sodium silicoaluminate, gypsum and plastic pigment and a large number of special pigments, such as barium sulphate and zinc oxide. The total amount of pigment in the coating composition is usually 5–65 percent by weight and may constitute 4 to 20 times the amount of weight of latex. Of the total amount of pigment, the amount of calcium carbonate normally constitutes 5–100 percent by weight.

The composition according to the invention also contains a latex binder, which can be any conventional latex binder, conveniently in an amount of 2–70, preferably 5–30, percent by weight based on the weight of the coating mixture. The latex may consist of copolymers which are made of monomers from the group ethylenically unsaturated carboxylic acids, esters of acrylic acid and methacrylic acid, acrylonitrile, methacrylonitrile, acrylamide, methacrylamide, $C_3$–$C_5$ ethylenically unsaturated monocarboxylic acids, ethylenically unsaturated dicarboxylic acids and their halfesters, vinyl chloride, ethylenically unsaturated hydrocarbons, vinyl ester, vinyl sulphonic acid and esters of unsaturated carboxylic acids which are derived from polyvalent alcohols. Examples of suitable copolymers are polymers of vinyl acetate and acrylate, copolymers of vinyl acetate, ethylene and vinyl chloride, copolymers of styrene and acrylates, copolymers of styrene and butadiene and copolymers of styrene, butadiene and acrylonitrile and mixtures thereof. Said copolymers can also contain further monomers, such as esters of unsaturated carboxylic acids and unsaturated carboxylic acids can be copolymerised. It is also possible to use homopolymers, for example of acrylic acid and vinyl esters. As supplementary binders to the latex binders, sometimes called secondary binders, also polyvinyl alcohol, modified cellulose starch, casein, alginate, cellulose esters and high molecular carboxylic containing polymers can be added.

A typical aqueous coating composition for use according to the invention has the following composition based on its dry content:

0.07–5, preferably 0.3–2 percent by weight of the alkylhydroxyalkyl cellulose or the alkylhydroxyalkyl cellulose and the carboxymethyl cellulose at the weight ratios defined above.

4–15, preferably 7–13 percent by weight of latex,

60–94, preferably 70–90 percent by weight of pigment, of which 5–100 percent by weight is calcium carbonate, 0–10, preferably 0–7 percent by weight of secondary binder, 0–3, preferably 0.1–2 percent by weight of dispersant, 0–5, preferably 0–2 percent by weight of protective colloid, 0–4, preferably 0–2 percent by weight of other additives, such as optical whitener, bactericides, pH-regulating agents, antifoam agent and lubricant, the dry content being 20–72 percent by weight. The Brookfield viscosity of the coating composition is usually 100–2500 mPa·s at 100 revolutions/minute and at 20° C. The viscosity of coating compositions with the dry content of 55–72 percent by weight is 600–2500 mPa·s. An aqueous coating composition for use according to the invention can be made by the pigment part being dispersed in water, possibly by means of a dispersant. To the obtained pigment wash, one may then add secondary binders, alkylhydroxyalkyl cellulose, carboxymethyl cellulose and other additives included in the composition and, finally, latex, preferably in the form of a dispersion.

A cellulose-based product coated with the above-mentioned composition can be prepared by a) applying the composition on the cellulose-based product at a temperature below the turbidity point of the alkylhydroxyalkyl cellulose, b) drying the surface-shaped cellulose product by heating, the cellulose product being coated with the composition, and c) calendering the cellulose product, if desired.

The application of the composition takes place in a manner known per se, for instance, by air knife coating, roller coating or blade coating. Owing to season and geographical location, the temperature of the composition is usually in the range 5–55, preferably 20–40° C.

The invention is further illustrated by the following examples.

EXAMPLE 1

A sheet of white paper of the grammage 80 g/m² was coated with a precoating mixture consisting of 100 parts by weight of rough calcium carbonate; 10 parts by weight of styrene-butadiene-latex; 0.2 parts by weight of optical whitener; 0.6 parts by weight of sodium carboxymethyl cellulose (CMC) with a viscosity of 10 mPa·s, Finnfix 10 supplied by Metsa Speciality Chemicals or 0.3 parts by weight of ethylhydroxyethyl cellulose (EHEC) with a turbidity point of 65° C. and a viscosity measured in 2% solution according to Brookfield at 25° C. and 25 rpm of 300 mPa·s and water to obtain a dry content of 6.5 percent by weight. The properties of the obtained surface were determined by measuring the contact angle of water and diiodomethane. Besides, the surface energy and the relative polarity were determined. The contact angle was measured according to Tappi 458 cm–94. The surface energy and the relative polarity were calculated based on the contact angles of the samples and known polarity constants. A small contact angle, high surface energy and a high relative polarity indicate good printing properties.

The following results were obtained:

TABLE 1

| Properties | Precoating with | |
| --- | --- | --- |
| | (CMC) | (EHEC) |
| Contact angle, 0.1 s | | |
| Water, ° | 102.8 | 84.3 |
| Diiodomethane, ° | 44.8 | 42.4 |
| Surface energy, mJ/m$^2$ | 37.15 | 40.79 |
| Relative polarity, % | 0.1 | 5.9 |

The results show that the hydrophilicity of paper precoated with a mixture containing EHEC is higher than for paper coated with a mixture containing CMC. Both the surface energy and the polarity are improved when the mixture contains EHEC.

EXAMPLE 2

The sheet of paper which in Example 1 was coated with a precoating mixture containing EHEC was then coated with a top-coating mixture containing 80 parts by weight of fine calcium carbonate; 20 parts by weight of ultrafine clay; 11 parts by weight of styrene-butadiene-latex; 0.2 parts by weight of optical whitener; 0.2 parts by weight of CMC according to Example 1 or 0.15 parts by weight of EHEC according to Example 1, and water to obtain a dry content of 63 percent by weight.

The contact angle, the surface energy and the relative polarity were determined in the same manner as in Example 1. The following results were obtained:

TABLE 2

| Properties | Top-coating mixture | |
| --- | --- | --- |
| | CMC | EHEC |
| Contact angle | | |
| Water, ° | 79.05 | 68.95 |
| Diiodomethane, ° | 41.85 | 39.40 |
| Surface energy, mJ/m$^2$ | 42.66 | 47.73 |
| Relative polarity, % | 9.4 | 16.4 |

Like in Example 1, the surfaces coated with a mixture containing EHEC exhibit better properties than the surfaces coated with a mixture containing CMC.

EXAMPLE 3

The coated sheets of paper of Example 2 were also tested with respect to surface roughness for some different printing inks of the brand Challenge made by Sun Chemical. The paper was printed in sheet offset with the printing inks and printing ink combinations indicated below. The surface roughness was determined according to T 555 pm–94.

The following results were obtained:

TABLE 3

| Print | Surface roughness of the print, $\mu$m | |
| --- | --- | --- |
| | CMC | EHEC |
| Black No 1 | 0.785 | 0.725 |
| Cyan | 0.860 | 0.780 |
| Magenta | 0.795 | 0.785 |
| Black No 4 | 0.915 | 0.850 |
| Cyan/Magenta/Black | 1.020 | 0.935 |
| Water | 0.705 | 0.665 |

The results show that the coating mixtures containing EHEC gave a smoother surface than the mixtures containing CMC.

EXAMPLE 4

Paper that had been precoated with the mixture containing EHEC was coated with coating mixtures having varying contents of EHEC and CMC according to the following table. EHEC and CMC were of the same type as in Example 1.

| | Components parts by weight | | | | |
| --- | --- | --- | --- | --- | --- |
| Mixture Designation | Fine Carbonate | Ultrafine clay | S-B latex | EHEC | CMC |
| A | 75 | 25 | 11 | | 0.80 |
| B | 75 | 25 | 11 | 0.06 | 0.72 |
| C | 75 | 25 | 11 | 0.10 | 0.60 |
| D | 75 | 25 | 11 | 0.20 | 0.40 |
| E | 75 | 25 | 11 | 0.30 | 0.20 |
| F | 75 | 25 | 11 | 0.35 | 0.10 |
| G | 75 | 25 | 11 | 0.40 | — |

The mixtures also contained water in such an amount that the dry content of the mixture was 65 percent by weight.

The top coated sheets of paper were then tested with respect to the contact angle in the time interval 0.1–1 s.

The following results were obtained:

TABLE 4

| Mixture Designation | Contact angle, ° | | | |
| --- | --- | --- | --- | --- |
| | 0.1 s | 0.4 s | 0.7 s | 1.0 s |
| A | 104.8 | 100.6 | 98.9 | 97.7 |
| B | 79.2 | 77.3 | 77.0 | 76.9 |
| C | 76.0 | 74.5 | 74.3 | 74.1 |
| D | 76.4 | 74.5 | 74.1 | 74.0 |
| E | 72.6 | 72.0 | 71.2 | 70.5 |
| F | 71.8 | 71.0 | 70.0 | 69.4 |
| G | 70.4 | 68.0 | 67.5 | 67.0 |

The results show that even a relatively small content of EHEC in combination with CMC synergically improves the hydrophilicity of the surface compared to a mixture that contains CMC only.

EXAMPLE 5

Coating mixtures were made with the following compositions:

| Components | Composition, parts by weight | | | |
|---|---|---|---|---|
| | H | I | J | K |
| Fine calcium carbonate | 75 | 75 | 75 | 75 |
| Ultrafine clay | 25 | 25 | 25 | 25 |
| Styrene-butadiene-latex | 11 | 11 | 11 | 11 |
| EHEC (according to Example 1) | 0.3 | 0.15 | 0.2 | — |
| CMC (according to Example 1) | — | 0.25 | 0.3 | 0.5 |
| Water | to obtain a dry content of 65 percent by weight | | | |

These coating mixtures were applied on both sides of a sheet of paper which on both sides was precoated with the mixture which contained EHEC and which has been described in Example 1.

The roughness, gloss, printing gloss (mean value for Cyan/Magenta/Black) and set-off of the surfaces were determined for both the wire side and the felt side. The set-off was determined a certain time after the printing by pressing the print against a receiving paper surface. The set-off value is indicated in accordance with the formula $$s = lg(R/Rs)$$

wherein R is the reflectivity of the receiving paper and Rs the reflectant factor measured on the set-off of the receiving paper. The gloss was measured according to T 480 if −92.

The following results were obtained:

TABLE 5

| Properties | Composition | | | |
|---|---|---|---|---|
| | H | I | J | K |
| Surface roughness, μm | | | | |
| F | 1.36 | 1.36 | 1.37 | 1.48 |
| V | 1.25 | 1.23 | 1.32 | 1.36 |
| Gloss, % | | | | |
| F | 56.5 | 57.5 | 56.0 | 53.5 |
| V | 62.0 | 62.5 | 62.5 | 58.5 |
| Printing gloss, % | | | | |
| F | 82.0 | 82.0 | 81.0 | 81.0 |
| V | 76.0 | 76.0 | 77.0 | 76.0 |
| Set-off | | | | |
| 15 s F | 1.10 | 1.35 | 1.55 | 1.70 |
| 15 s V | 1.40 | 1.35 | 1.40 | 1.65 |
| 35 s F | 1.05 | 1.25 | 1.25 | 1.60 |
| 35 s V | 1.25 | 1.15 | 1.25 | 1.55 |
| 45 s F | 0.95 | 1.10 | 1.10 | 1.55 |
| 45 s V | 1.10 | 1.00 | 1.15 | 1.30 |

The results clearly show that the mixtures H-J in accordance with the invention exhibit improved properties as regards surface roughness, gloss, printing gloss and set-off than the reference mixture K.

EXAMPLE 6

Mixtures for top-coating were made with the following compositions:

| Constituents | Mixture, parts by wt. | | | |
|---|---|---|---|---|
| | L | M | N | O |
| Clay | 75 | 75 | 75 | 75 |
| Fine calcium carbonate | 25 | 25 | 25 | 25 |
| Styrene-butadiene | 11 | 11 | 11 | 11 |
| EHEC (according to Example 1) | 0.5 | 0.35 | 0.2 | — |
| CMC (according to Example 1) | — | — | 0.3 | 0.5 |
| Water | to obtain a dry content of 65 percent by weight | | | |

A precoated sheet of paper according to Example 1 containing EHEC was coated with the coating mixtures L to O, after which the contact angles and surface energies (Table 6a) of the obtained surfaces and the roughness and gloss of the surfaces were determined for different amounts of the coating mixtures M, N and O (Table 6b).

The following results were obtained:

TABLE 6a

| Mixture | Contact angle, % | Surface energy mJ/m² |
|---|---|---|
| L | 64.9 | 49.5 |
| M | 66.0 | 48.2 |
| N | 68.0 | 46.7 |
| O | 73.8 | 43.3 |

TABLE 6b

| | Mixture | | |
|---|---|---|---|
| | M | N | O |
| Surface roughness, μm | | | |
| Coating g/m² | | | |
| 12 | 0.96 | 0.96 | 1.12 |
| 13 | 0.91 | 0.92 | 1.04 |
| 14 | 0.84 | 0.85 | 0.99 |
| 15 | 1.82 | 0.82 | 0.95 |
| Gloss | | | |
| Coating g/m² | | | |
| 12 | 71.6 | 72.3 | 71.6 |
| 13 | 73.3 | 74.5 | 73.2 |
| 14 | 74.4 | 75.6 | 74.2 |
| 15 | 76.0 | 76.0 | 75.3 |

The results show that the sheets of paper coated with the mixtures containing EHEC or a mixture of EHEC and CMC have a higher hydrophilicity (lower contact angle), higher surface energy, higher smoothness and higher gloss than sheets of paper coated with the mixture containing CMC only.

EXAMPLE 7

In the Example mixtures were made for top-coating with the same basic formulation as in Example 1 but with different cellulose derivatives, MEHEC representing methylethylhydroxyethyl cellulose, HMEHEC representing $C_{12}$-hydrophobically modified ethylhydroxyethyl cellulose and HEC standing for hydroxyethyl cellulose. The compositions were made up as follows:

| Constituents | Composition | | | | | | |
|---|---|---|---|---|---|---|---|
| | P | Q | R | S | T | U | W |
| Fine calcium carbonate | 75 | 75 | 75 | 75 | 75 | 75 | — |
| Ultrafine clay | 25 | 25 | 25 | 25 | 25 | 25 | — |
| Styrene-butadiene | 11 | 11 | 11 | 11 | 11 | 11 | — |
| CMC (according to Ex. 1) | 0.8 | — | — | — | — | — | — |
| MEHEC, 310 cP, turbidity point 66° C. | — | 0.265 | — | — | — | — | — |
| HMEHEC, 153 cP, turbidity point 65° C. | — | — | 0.45 | — | — | — | — |
| EHEC, 80 cP, turbidity point 65° C. | — | — | — | 0.45 | — | — | — |
| EHEC, 300 cP, turbidity point 65° C. | — | — | — | — | 0.4 | — | — |
| HEC, 300 cP, | — | — | — | — | — | 0.65 | — |
| Water | to obtain a dry content of 65 percent by weight | | | | | | |

Uncoated white paper of a grammage of 80 g/m² was coated with one of the coating mixtures P to U in an amount of 14 g/m². The paper W was uncoated.

The surface energies and the contact angles of the different sheets of paper were determined as a function of time. The following results were obtained:

TABLE 7a

| | Surface energy, mN/m² | | | |
|---|---|---|---|---|
| Composition | 0.1 s | 0.3 s | 0.6 s | 1.0 s |
| P | 42.0 | 45.5 | 47.5 | 48.0 |
| Q | 47.5 | 50.0 | 52.5 | 53.0 |
| R | 48.0 | 50.0 | 52.0 | 52.5 |
| S | 47.5 | 50.0 | 52.5 | 54.0 |
| T | 52.0 | 54.5 | 56.5 | 57.0 |
| U | 45.5 | 48.0 | 50.0 | 51.5 |
| W | 31.0 | 34.5 | 35.0 | 35.5 |

TABLE 7b

| | Contact angle, ° | | | | | |
|---|---|---|---|---|---|---|
| Composition | 0.05 s | 0.1 s | 0.4 s | 1 s | 4 s | 10 s |
| P | 103.08 | 100.5 | 97.5 | 92.0 | 86.5 | 83.0 |
| Q | 84.5 | 82.5 | 80.0 | 78.5 | 74.0 | 71.5 |
| R | 86.5 | 85.5 | 84.5 | 83.5 | 80.0 | 77.5 |
| S | 82.5 | 80.0 | 75.5 | 71.0 | 63.0 | 57.5 |
| T | 78.5 | 77.0 | 75.0 | 72.5 | 70.5 | 69.5 |
| U | 95.0 | 93.5 | 91.0 | 88.5 | 85.5 | 82.5 |

The results show that the coating mixtures Q, S and T which contain a cellulose ether according to the invention give a surface with higher surface energy and higher hydrophilicity than the reference mixtures, P, R and U which contain CMC, hydrophobically modifying cellulose ether or HEC.

We claim:

1. A method of improving the gloss and the printability of the surface which is obtained when paper or cardboard is coated with the coating composition, said method comprising applying a coating composition to said surface wherein said coating composition comprises calcium carbonate, latex and at least one non-ionic alkylhydroxyalkyl cellulose, which has alkyl groups having 1–3 carbon atoms and hydroxyalkyl groups having 2–3 carbon atoms, is free from hydrophobically modifying hydrocarbon groups having at least 4 carbon atoms and has a turbidity point of 50–95° C., wherein said coating may further optionally comprise at least one carboxymethyl cellulose, where the amount of the carboxymethyl cellulose is 1200 percent by weight at the most of the amount of the alkylhydroxyalkyl cellulose.

2. The method of claim 1 wherein the amount of carboxymethyl cellulose is 50–600 percent by weight of the amount of alkylhydroxyalkyl cellulose.

3. The method of claim 1 wherein the alkylhydroxyalkyl cellulose is selected from the group consisting of ethylhydroxyethyl cellulose, methylethylhydroxyethyl cellulose, methylethylhydroxyethylhydroxypropyl cellulose, methylhydroxyethyl cellulose, methylhydroxypropyl cellulose and mixtures thereof.

4. The method of claim 1 wherein the carboxymethyl cellulose is sodium carboxymethyl cellulose.

5. The method of claim 1 wherein the alkylhydroxyalkyl cellulose has a viscosity of 10–10,000 mPa·s, measured in a Brookfield viscosimeter of the type LV in a 2% water solution at 20° C.

6. The method of claim 1 wherein the carboxymethyl cellulose has a viscosity of 5–5000 mPa·s, measured in a Brookfield-viscosimeter of the type LV in a 2% water solution at 20° C.

7. An aqueous coating composition which contains, based on the dry content,
   0.07–5 percent by weight of a combination of alkylhydroxyalkyl cellulose and carboxymethyl cellulose wherein the amount of carboxymethyl cellulose is 50–600 percent by weight of the amount of alkylhydroxyalkyl cellulose
   4–15 percent by weight of latex,
   60–95 percent by weight of pigment which comprises 5–100 percent by weight is calcium carbonate,
   the dry content of the composition being 20–72 percent by weight.

8. The coating composition of claim 7, wherein its viscosity is 100–2500 mPa·s measured in a Brookfield viscosimeter at 100 revolutions/minute and at 20° C.

9. The method of claim 2 wherein the alkylhydroxyalkyl cellulose is selected from the group consisting of ethylhydroxyethyl cellulose, methylethylhydroxyethyl cellulose, methylethylhydroxyethylhydroxypropyl cellulose, methylhydroxyethyl cellulose, methylhydroxypropyl cellulose and mixtures thereof.

10. The method of claim 2 wherein the carboxymethyl cellulose is sodium carboxymethyl cellulose.

11. The method of claim 4 wherein the alkylhydroxyalkyl cellulose has a viscosity of 10–10,000 mPa·s, measured in a Brookfield viscosimeter of the type LV in a 2% water solution at 20° C.

12. The method of claim 5 wherein the carboxymethyl cellulose has a viscosity of 5–5000 mPa·s, measured in a Brookfield-viscosimeter of the type LV in a 2% water solution at 20° C.

* * * * *